July 13, 1954  W. PALMER  2,683,873
SEQUENCE TESTING SYSTEM
Filed March 24, 1947  2 Sheets-Sheet 1

INVENTOR.
WINSLOW PALMER
BY Paul B. Hunter.
ATTORNEY

July 13, 1954

W. PALMER 2,683,873

SEQUENCE TESTING SYSTEM

Filed March 24, 1947

INVENTOR.
WINSLOW PALMER
BY
Paul B. Hunter
ATTORNEY

Patented July 13, 1954

2,683,873

UNITED STATES PATENT OFFICE 2,683,873

SEQUENCE TESTING SYSTEM

Winslow Palmer, West Hempstead, N. Y., assignor to The Sperry Corporation, a corporation of Delaware Application March 24, 1947, Serial No. 736,648

18 Claims. (Cl. 343—103)

The present invention relates generally to timing means and, more particularly, to timing methods and apparatus for automatically selecting periodic waves received through a common source, measuring the recurrent time interval between two such selected waves, and providing a continuous indication thereof.

The present invention is specifically directed towards providing timing apparatus of the abovementioned type for use with a single signal source, such as a radio receiver.

Existing timing apparatus is available to measure intervals, between periodic reference signals from one source, and delayed signals from another source. Such apparatus generally includes a pair of local oscillator timers one of which is synchronized by the periodic reference signals, the other is synchronized by the periodic delayed signals. Each oscillator "locks in" or is synchronized by the desired received signal and a time measuring device may be connected to the output circuits of two such synchronized oscillators to indicate the time interval between the received signals with which the respective oscillators are in synchronism. Detailed apparatus of this type is described in my Patent 2,574,494 for Timing Apparatus, granted November 13, 1951.

When timing apparatus of this type is used to measure the interval between periodic reference and delayed signals, for example, loran signals, received through a single source, such as a radio receiver, there are several inherent possibilities of error in the sequence of synchronization.

These errors may be classified as follows:

(1) *Double synchronization error.*—This occurs when both local oscillators synchronize with the same signal, i. e., either the reference signal or the delayed signal.

(2) *Inverted synchronism error.*—This error occurs when the delayed oscillator synchronizes on the reference signal and the reference oscillator synchronizes on the delayed signal.

(3) *Sky wave error.*—This occurs when either local oscillator happens to synchronize on a sky wave transmission rather than the ground wave transmission, and it is objectionable because the sky wave transmission is a reflection and takes a longer time than the ground wave transmission, thereby introducing an error. Sky wave error is of course limited to those cases wherein the signals are transmitted by radio means.

Accordingly, a principal object of the present invention is to provide timing apparatus for automatically selecting periodic waves from a common source, measuring the time intervals between two such selected waves, and providing a continuous indication thereof.

Another object is to provide novel policing means for such timing apparatus to thereby avoid existing possibilities of error of synchronization sequence.

Another object is to provide apparatus adapted to establish correct synchronism between a local reference oscillator and periodic reference signals and between a local delayed oscillator and periodic delayed signals.

Other objects and advantages will be apparent from the following description and drawings wherein Fig. 1 is a block diagram of an embodiment of the invention;

Figure 1:
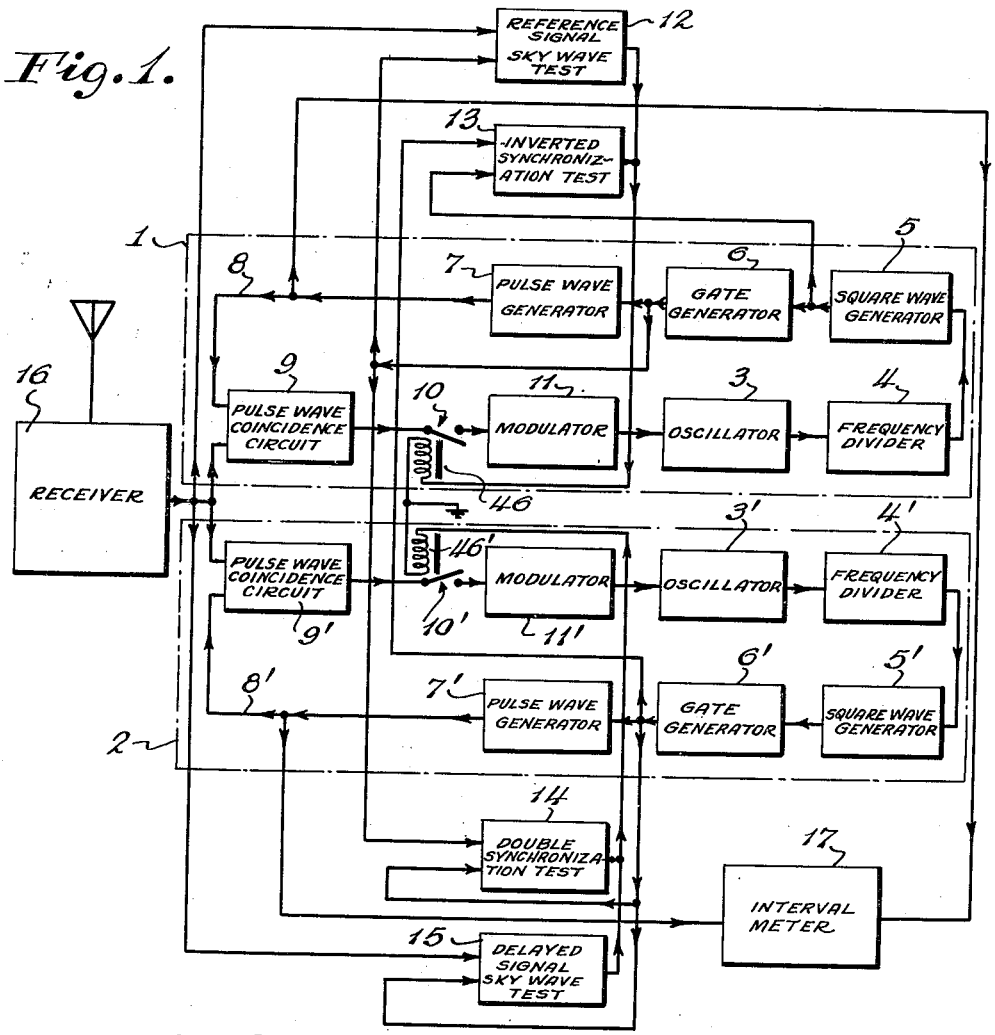

Referring to Fig. 1 there is shown a timing apparatus adapted to determine the time interval between periodic reference and delayed waves received through a single source.

This apparatus comprises a receiver 16, a timer 1 adapted to synchronize with the periodic reference signal, a second timer 2 adapted to synchronize with the delayed signal, policing circuits 12, 13, 14 and 15 adapted to regulate the sequence of the synchronizing action of the timers, and an interval meter 17 connected to the outputs of the timers, to thereby continuously indicate the desired time interval. The interval meter 17 may be of the type shown in Patent No. 2,414,107 entitled "Electronic Timing Apparatus," filed June 30, 1944, and issued January 14, 1947, in the name of David E. Kenyon.

Reference timer 1 is of the type disclosed in my aforementioned application Serial No. 684,060 and employs a relatively high frequency oscillator 3 as a timing standard. A frequency divider 4 is connected to oscillator 3 and is adapted to reduce the generated repetition frequency to approximately the frequency of the received reference and delayed signals. The relatively low frequency waves from divider 4 are supplied to a square wave generator 5 which provides a square wave of the same frequency. The square wave generator 5 is connected to, and triggers a gate voltage generator 6, thereby providing a gate voltage of convenient duration, say one thousand microseonds at the square wave frequency.

The gate generator 6 is connected to pulse wave generator 7, which is adapted to produce trigger pulse waves in response to the negative going edge of the one thousand microsecond gate. The trigger waves are applied over lead 8 to a pulse wave coincidence circuit 9, to which is also supplied the reference signals from receiver 16.

Pulse wave coincidence circuit 9, as disclosed in my copending application #684,060, for a Timing Apparatus, filed July 16, 1946, now Patent 2,574,494, granted November 13, 1951, is adapted to produce a rectangularly-shaped frequency control wave whose amplitude is substantially proportional to the amplitude of any wave supplied from receiver 16 at the moment that the circuit is triggered by a pulse wave generator 7. Pulse wave coincidence circuit 9 thus samples the amplitude of the reference signal and each cycle of its frequency control wave output has an amplitude corresponding to the instant amplitude when the signal applied from receiver 16 is momentarily examined. The frequency control waves generated by pulse wave coincidence circuit 9 are applied through relay 10 to modulator 11, which may be a reactance tube frequency modulator which is adapted to vary the frequency of oscillator 3 in response to the frequency control waves.

Thus, the overall function of the timer 1 is to synchronize the pulse wave from pulse wave generator 7 with the periodic reference wave received from receiver 16.

Delayed timer 2 comprises oscillator 3', frequency divider 4', square wave generator 5', gate generator 6', pulse wave generator 7', lead 8', pulse wave coincidence circuit 9', relay 10' and modulator 11' all of which are adapted to co-operate in a similar manner as described above to thereby synchronize the output of pulse wave generator 7' with the delayed signals received from receiver 16.

Policing circuits 12, 13, 14 and 15, cooperate to check the synchronizing circuits in order that they synchronize in the proper sequence, as will be more fully explained in connection with Fig. 2.

The operation of the embodiment of Fig. 1 may be described with reference to the wave forms of Fig. 2, wherein; part A shows periodic reference signals 20 and delayed signals 21, as they appear in the output of receiver 16. Each of these received signals, which may, for example, be loran signals, comprises a ground wave such as 22 and one or more sky waves such as 23 and 24.

Part B shows the reference signal gate voltage 25 which is the output of gate generator 6.

Part C shows the delayed signal gate voltage 26 which is generated by generator 6'.

Part D shows the reference signal synchronizing pulse 27 which is the input of pulse wave coincidence circuit 9.

Part E shows the delayed signal synchronizing pulse 28 which is the input of pulse wave coincidence circuit 9'. The time interval to be measured is indicated by numeral 31.

Part F shows the reference signal square wave 29, which is the output of square wave generator 5.

Part G shows the delayed signal square wave 30, which is the output of reference wave generator 5'.

It is preferable that the local pulses D and E be several times shorter in duration than the rise time of the loran pulses A so that the instantaneous amplitude of the loran pulses may be momentarily sampled.

When unsynchronized, the frequency of oscillator 3 is chosen to be slow relative to the recurrence frequency of the signals received by receiver 16, so that the pulse from pulse wave generator 7 drifts up to the front edge of the incoming pulse signals. At the proper time relationship, between the pulse from generator 7 and incoming pulse, a synchronizing signal is generated by pulse wave coincidence circuit 9, which is applied through normally closed relay 10, and modulator 11, to thereby synchronize the frequency of oscillator 3 with the frequency of the incoming pulse as fully explained in the above-mentioned application Serial No. 684,060. If relay 10 is opened the synchronizing signal will not be applied to the modulator 11 and the timer will drift out of synchronism.

The object of the policing or test circuits 12, 13, 14 and 15 is to automatically check that the timing circuits are properly synchronized. If they are not synchronized in the proper sequence, there will be a coincidence of signals at the input of the appropriate test circuit, and it will then have an output which will block the synchronizing action in one or the other timer, thereby permitting the timer to drift and lose synchronization. The free timer then synchronizes on the next following pulse.

As previously mentioned, there are three conditions of error, to be tested for by the policing circuits, namely:

1. Double synchronization error, which occurs when both timing circuits synchronize on either the reference or the delayed signal.

2. Inverted synchronization error, which occurs when both timing circuits synchronize on the wrong or opposite signal.

3. Sky wave synchronization error, which occurs when either timer synchronizes on a received sky wave rather than on the ground wave.

Figure 2:
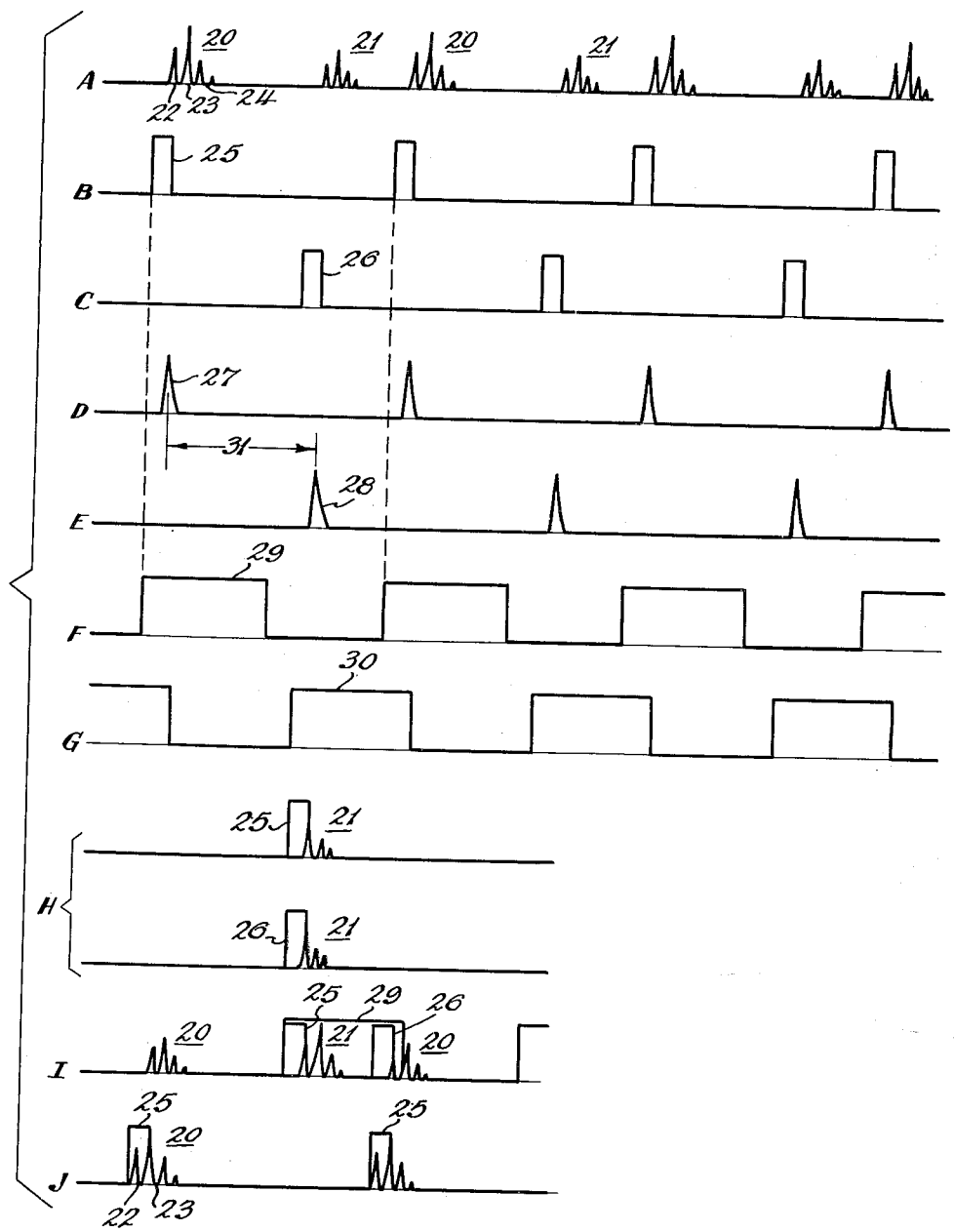
Fig. 2 is a series of wave forms illustrative of the operation of the invention.

Part H of Fig. 2 illustrates the time sequence of wave forms occurring under the condition of double synchronization, that is, both timers synchronizing on the same signal either reference signal 20 or delayed signal 21. When this happens, the one thousand microsecond pedestals 25 and 26 of the reference timer 1 and the delayed timer 2 will coincide in time, as illustrated. As they are both applied to the input of the double synchronizing test circuit 14, it will generate an output which will open relay 10' to thereby cut off the synchronizing signal from modulator 11' thus causing delayed timer 2 to fall out of synchronism. The timer 2 will then drift until it is synchronized by another signal, from receiver 16.

Part I of Fig. 2 illustrates the coincidence of wave forms occurring under the condition of inverted synchronism, i. e. the reference timer 1 has synchronized on the delayed signal 21 and the delayed timer 2 has synchronized on the reference signal 20. In this case, use is made of the fact, that the delayed loran pulse 21 is always more than one-half cycle behind the reference pulse, and therefore the delayed gate 26, when properly synchronized, occurs during the negative portion of the reference timer square wave 29. However, when the synchronism is inverted, the delayed timer gate 26 coincides with the positive portion of the reference timer square wave 29 generated by square wave generator 5. Both of these signals are applied as shown in Fig. 1 to the inputs of inverted synchronization test circuit 13 which will then, in response to this coincidence, generate a signal output which will open relay 10 and thereby block the synchronization signal to oscillator 3 thus causing the timer 1 to drift.

Part J illustrates the coincidence of wave forms occurring under the condition of sky wave synchronization. To detect sky wave synchronization, use is made of the fact that in any train of signals which make up a received radio transmission, there will first be a ground wave 22 and then several sky wave reflections 23 and 24 separated by intervals of less than one thousand microseconds. Therefore, in testing for synchronization on a sky wave, a one thousand microsecond voltage pedestal 25 and 26 is generated just before the synchronization pulse. Thus, when the timer is synchronized on the sky wave 23, the ground wave 22, or the next preceding sky wave, will coincide in time with the one thousand microsecond pedestal 25 or 26, as illustrated. The coincidence of these two voltages occurring at the input of either of the sky wave test circuits 12 or 15 will generate a signal output in the appropriate one of them, which will block the synchronizing action of its associated timer.

To illustrate the operation of the policing circuits, assume synchronization in the worst possible order, that is, both timers synchronized on a sky wave reference pulse.

1. Received pulses would coincide with the test gates 25 and 26 in both sky wave test circuits 12 and 15, causing both timers to lose synchronism and drift from the reference pulses, testing and rejecting each successive sky wave that they pass over.

2. Both timers would then synchronize on the ground wave component of delayed signal 21. Bias would appear in the double synchronization test circuit 14 causing the timer 2 to lose synchronism. The timer 2 would synchronize on each pulse of the delayed wave train, in turn, test in the sky wave test circuit 15 and slip until it synchronized on the next reference pulse.

3. The inverted synchronism test circuit 13 would then operate to unsynchronize the timer 1 from the delayed pulse. The timer 1 would drift, synchronizing and rejecting each sky wave in turn and would finally synchronize on the ground wave reference pulse 22. The double synchronism test circuit 14 would unsynchronize the timer 2 again. It would check on each sky wave, finally drift to and synchronize on the ground wave of delayed pulse 21. All the test conditions are now satisfied, the system would stay in synchronism and operate stably.

Figure 3:
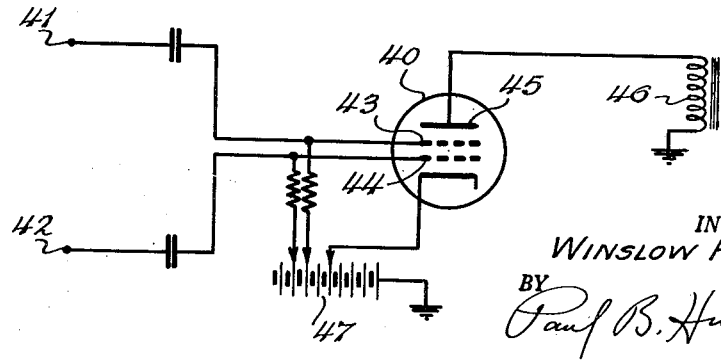
Fig. 3 is a schematic wiring diagram of a coincidence circuit suitable for use with the embodiment of Fig. 1.

Referring to Fig. 3 there is shown a schematic diagram of a coincidence circuit adapted to be used in any of the policing test circuits 12, 13, 14 and 15. The coincidence circuit has two inputs 41 and 42 connected to separate grids 43 and 44 of a vacuum tube 40. The tube 40 is normally cut off, by bias voltages from bias supply 47 and will conduct only if signals at inputs 41 and 42, coincide. Coil 46, connected between plate 45 and vacuum tube 40 and ground, is the coil of relay 10 of Fig. 1. When a coincidence of signals occurs at inputs 41 and 42, coincidence tube 40 conducts, thereby energizing coil 46 and actuating the relay. Other types of coincidence circuits well-known to the art may be substituted for this embodiment, in the policing test circuits.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Timing apparatus comprising reference and delayed local oscillators adapted to be synchronized by reference and delayed incoming signals, means to synchronize said oscillators with said incoming signals, means to generate recurrent gate voltages having definite time relations to each local oscillator output, a test circuit responsive to the coincidence of said gate voltages, and relay means responsive to said test circuit to interrupt the synchronization of said local oscillators.

2. Timing apparatus for automatically measuring recurrent intervals between periodic reference signals and periodic delayed signals received through a single source, comprising a timer adapted to synchronize with said reference signal, a second timer adapted to synchronize with said delayed signal, means to thereby automatically measure the time duration from said reference timer output to said delayed timer output and means to synchronize said timers in the proper sequence including circuit means responsive to double synchronization, circuit means responsive to inverted synchronization, and circuit means responsive to sky wave synchronization.

3. In timing apparatus of the type utilizing reference and delayed oscillators synchronized by incoming reference and delayed signals to measure the interval between said reference and delayed signals, means to automatically select the proper sequence of synchronization, comprising means to control the frequency of said oscillators, means fed from said delayed oscillator to generate a first voltage having a definite time relationship to the delayed oscillator signal, means fed from said reference oscillator to generate a second voltage having a definite time relationship to said reference oscillator signal, and means fed from said last two generating means and responsive to the coincidence of said first and second voltages to selectively block the synchronization of one of said local oscillators.

4. In timing apparatus of the type utilizing a receiver and reference and delayed local oscillators synchronized by received radio signals, means to automatically synchronize said oscillators with the ground wave components of the respective reference and delayed signals, comprising means fed from said local oscillators to generate voltages having definite time relationships to their respective local oscillator outputs, and means fed from said receiver and said generating means responsive to the coincidence of one of said generated voltages and any component of its respective incoming radio signal to detect improper sky wave synchronization.

5. In timing apparatus of the type utilizing a receiver and local oscillators synchronized by incoming reference and delayed signals, means to automatically select the proper sequence of synchronization, comprising means to control the frequency of said oscillators; means to avoid double synchronization of both oscillators on one signal including means fed from said local oscillators to generate recurrent gate voltages having definite time relations to each local oscillator output, and means fed from said gate generators and including a circuit responsive to the coincidence of said gate voltages to selectively block said frequency control; means to avoid inverted synchronization of said local oscillators, including means fed from said delayed oscillator to generate a first voltage having a definite time relationship to the delayed oscillator signal, means fed from said reference oscillator to generate a second voltage having a definite relationship to said reference oscillator signal, and means fed from said generators responsive to the coincidence of said first and second voltages to selectively block the frequency control of one of said local oscillators; means to automatically synchronize said oscillators with the ground wave components of the respective reference and delayed signals, comprising means fed from said oscillators to generate voltages having definite time relationships to their respective local oscillator outputs, and means fed from said receiver and one of said generators and including a circuit responsive to the coincidence of one of said generated voltages and any component of its respective incoming radio signal.

6. In apparatus for timing the interval between periodic reference and delayed pulse wave signals from a single source, means for generating a periodic reference synchronizing pulse wave at a frequency normally lower than that of said signals, means fed from said source and said generator for producing a frequency control wave having an amplitude dependent upon the amplitude of the reference signal at the instant the synchronizing pulse wave occurs, means fed from said control wave producer and connected to said oscillator for increasing the frequency of said synchronizing pulse wave in response to the control wave amplitude to maintain the reference synchronizing pulse wave in coincidence with the reference signal, means for generating a delayed synchronizing pulse wave normally increasingly delayed with respect to the reference synchronizing pulse wave, means fed from said source and said delayed generator for producing a delay control wave having an amplitude dependent upon the amplitude of the delayed signal at the instant the delayed synchronizing pulse wave occurs, means fed from said delay control wave generator and connected to said delay oscillator for decreasing the delay of the delayed synchronizing pulse wave in response to the delay control wave amplitude to maintain the delayed synchronizing pulse wave in coincidence with the delayed signal, and means for providing that the system synchronizes in the proper sequence, comprising control wave generators synchronized with said synchronizing pulse wave, coincidence tube test circuits responsive to said control waves, a relay means connected in the output of said frequency control wave means and responsive to said coincidence tube test circuits to interrupt said frequency control output.

7. Apparatus for timing the interval between received periodic reference and delayed pulse wave signals comprising means for locally generating a first synchronizing pulse wave at a frequency normally lower than that of said signals, means fed from said source and said generator for increasing the frequency of said first wave to maintain said first wave in coincidence with said reference signal, means for locally generating a second pulse wave normally increasingly delayed with respect to said first wave, means fed from said source and said generator and connected for producing a delay control wave having an amplitude dependent upon the amplitude of said delayed signal when said second wave is generated, means fed from said delay control generator for decreasing the delay of said second wave in response to the amplitude of said delay control wave to maintain said second wave in coincidence with said delayed signal, means fed from said local generators and responsive to the delay of said second wave with respect to said first wave for indicating the time interval between said signals and sequence testing means for providing that the system synchronizes in the proper sequence, comprising control wave generators synchronized by said local generating means, coincidence tube circuits responsive to said control wave generators and to said received signals and relay means responsive to said coincidence circuit means to selectively block said delay control wave.

8. In timing apparatus for automatically measuring an interval between received recurrent reference and delayed signals, a receiver local reference and delayed signal generators, pulse wave coincidence means fed from said receiver and said generators responsive to said received signals and said local generator signals, frequency control means fed from and responsive to said pulse wave coincidence circuit and connected to synchronize said local generators with said received signals, and means to automatically select the proper sequence of synchronization, comprising control wave means fed from and synchronized with said local signal generators and coincidence tube means fed from and responsive to said control wave means and connected to selectively block the frequency control of said local generators.

9. In timing apparatus of the type utilizing frequency controlled reference and delayed local signal generators arranged to be synchronized with reference and delayed incoming waves, means to automatically select the proper sequence of synchronization, comprising control wave generating means fed from and synchronized with said local signal generators, coincidence tube test means fed from and responsive to said control wave generating means, and relay means fed from and responsive to said coincidence tube test means to selectively block the frequency control of said local generators.

10. In timing apparatus of the type utilizing a pair of local oscillators synchronized by particular incoming signals received through a single source, means to automatically select the proper sequence of synchronization, including means adapted to control the frequency of said oscillators, means to detect the double synchronization of both oscillators on one signal, comprising a pair of control gate generators synchronized by said local oscillators, a coincidence test circuit connected to said gate generators and responsive to a coincidence of said local gate signals, and circuit interrupting means fed from and responsive to said coincidence test circuit and connected to interrupt the synchronizing of said local oscillators and received signals when there is a coincidence of said local gates, to thereby avoid the error of double synchronization.

11. In timing apparatus of the type utilizing local oscillators synchronized by pairs of incoming signals received through a single source, means to automatically select the proper sequence of synchronization, comprising means to control the frequency of said oscillators, and means to detect undesired synchronization of a local oscillator with a sky wave, comprising a pair of control gate generators fed from and synchronized by said local oscillators, a coincidence test circuit fed from said source and said gate generators and responsive to a coincidence of said control gate signals and signals received from said source, an interrupting means fed from and responsive to said coincidence test circuit and connected to and adapted to interrupt the synchronizing of said local oscillators to thereby prevent the undesirable condition for synchronizing the local oscillators on a sky wave reflection rather than on the desired ground wave signal.

12. In timing apparatus of the type for automatically measuring recurrent intervals between pairs of periodic signals received through a single source, and including a pair of timers adapted to selectively synchronize with said periodic signals; sequence testing circuits to insure synchronization in the proper sequence, comprising coincidence test circuit means connected to said timers and adapted to reject inverted synchronization, second coincidence test circuit means connected to said timers and adapted to reject double synchronization, third test circuit means fed from said source and one of said timers and connected to reject sky wave synchronization, switching means responsive to said coincidence circuits to correct the sequence of said timers, and means to automatically measure the interval between said timer outputs.

13. In timing apparatus of the type utilizing a receiver and a local oscillator synchronized by received pulse signals; means to automatically synchronize said local oscillator to the ground wave component of the received pulse signals comprising means connected to said local oscillator to generate a gate voltage having a definite time relation to the local oscillator output, and means connected to said receiver and said generating means and responsive to the coincidence of said generated voltage and the received pulse signals to reject improper sky wave synchronization.

14. Timing apparatus for automatically measuring recurrent intervals between periodic reference signals and periodic delayed signals received through a single receiver, comprising a first local generator adapted to synchronize with said reference signal, a second local generator adapted to synchronize with said delayed signal, means to automatically measure the time interval from said first local generator output to said delayed local generator output, and means to synchronize said local generators in the proper sequence including circuit means responsive to double synchronization, circuit means responsive to inverted synchronization, and circuit means responsive to sky wave synchronization.

15. In radio apparatus of the type utilizing a receiver and at least one local oscillator synchronized by received signals; means to automatically synchronize said oscillator with the ground wave component of said received signal, comprising means fed from said local oscillator to generate a voltage having definite time relationship to said local oscillator output, and means fed from said receiver and said generator means responsive to the coincidence of said generator voltage and any component of its respective incoming radio signal to reject improper sky wave synchronization.

16. In radio apparatus of the type utilizing a receiver and a local oscillator synchronized by received signals, means to automatically synchronize said oscillator with a component of said received signal, comprising means fed from said local oscillator to generate a gate voltage having definite time relationship to said local oscillator output, and means fed from said receiver and said generator means and responsive to the coincidence of said gate voltage and a component of its respective incoming radio signal to reject improper sky wave synchronization.

17. The timing apparatus as defined in claim 13 wherein said receiver is a hyperbolic navigation receiver receptive to recurrent pulse signals transmitted from a remote master station, said recurrent pulse signals including a ground wave component and at least one sky wave component, and wherein said means responsive to the coincidence of said generative voltage and the received pulse signals includes means coupled to said local oscillator for preventing said local oscillator from synchronizing to the sky wave component of said received pulse signals.

18. The timing apparatus as defined in claim 17 wherein said local oscillator synchronized by the received pulse signals from the remote master station produces an alternating output voltage at a higher frequency than the pulse recurrence frequency of the received pulse signals, and wherein said means connected to said local oscillator to generate a gate voltage includes frequency divider means producing output pulses whose pulse recurrence frequency is substantially equal to the pulse recurrence frequency of the signals received from said remote master station.

References Cited in the file of this patent

UNITED STATES PATENTS

| Number | Name | Date |
| --- | --- | --- |
| 1,816,621 | Stacy | July 28, 1931 |
| 2,293,932 | Cooper | Aug. 25, 1942 |
| 2,391,411 | Goble | Dec. 25, 1945 |
| 2,418,964 | Arenberg | Apr. 15, 1947 |
| 2,419,570 | Labin et al. | Apr. 29, 1947 |
| 2,426,216 | Hight | Aug. 26, 1947 |
| 2,426,910 | Wilson | Sept. 2, 1947 |